US008712368B2

(12) United States Patent
Moser et al.

(10) Patent No.: US 8,712,368 B2
(45) Date of Patent: Apr. 29, 2014

(54) SYSTEM AND METHOD FOR PROVIDING RADIO COMMUNICATION IN A LAND MOBILE RADIO SYSTEM

(75) Inventors: Brandon Wilson Moser, Waverly, NE (US); John Marvin Suzuki, Frisco, TX (US)

(73) Assignee: E.F. Johnson Company, Irving, TX (US)

(*) Notice: Subject to any disclaimer, the term of this patent is extended or adjusted under 35 U.S.C. 154(b) by 71 days.

(21) Appl. No.: 13/561,676

(22) Filed: Jul. 30, 2012

(65) Prior Publication Data

US 2013/0029633 A1 Jan. 31, 2013

Related U.S. Application Data

(60) Provisional application No. 61/513,409, filed on Jul. 29, 2011.

(51) Int. Cl.
*H04M 11/04* (2006.01)
(52) U.S. Cl.
USPC ....... 455/404.1; 455/26.1; 455/516; 455/521; 455/520
(58) Field of Classification Search
USPC ................. 455/404.1, 26.1, 516, 521, 520
See application file for complete search history.

(56) References Cited

U.S. PATENT DOCUMENTS

| 5,329,635 | A | 7/1994 | Wadin et al. |
| 5,487,181 | A | 1/1996 | Dailey et al. |
| 5,628,056 | A | 5/1997 | Grysiewicz et al. |
| 6,816,070 | B1 | 11/2004 | Hsu et al. |
| 7,072,622 | B2 | 7/2006 | Hsu et al. |
| 7,096,025 | B2 | 8/2006 | Phang et al. |
| 7,203,471 | B2 | 4/2007 | Cutcher et al. |
| 7,483,682 | B2 | 1/2009 | Williams |
| 7,792,499 | B2 | 9/2010 | Chen et al. |
| 8,463,316 | B2 * | 6/2013 | Jastram et al. ............. 455/550.1 |
| 2002/0008625 | A1 | 1/2002 | Adams et al. |
| 2006/0083380 | A1 | 4/2006 | Mino et al. |
| 2006/0216011 | A1 | 9/2006 | Godehn |
| 2006/0262800 | A1 | 11/2006 | Martinez et al. |
| 2007/0126573 | A1 * | 6/2007 | Valania ................... 340/539.13 |
| 2009/0036066 | A1 | 2/2009 | Chiu et al. |
| 2009/0233596 | A1 | 9/2009 | Calabrese |

(Continued)

OTHER PUBLICATIONS

Kenwood, "Kenwood Project 25 Digital Handheld Radios" (date unknown), 12 pgs.
EF Johnson Technologies, "EF Johnson Technologies, Inc. to Introduce FIRESafe™ Features at APCO" article, Jul. 30, 2010, 2 pgs.
EF Johnson Technologies, "EF Johnson Technologies, Inc. to Introduce FIRESafe™ Features at APCO" website article located at http://www.efjohnsontechnologies.com/news_room/viewer?article_id=31816, Jul. 30, 2010, 1 pg.

(Continued)

*Primary Examiner* — Kwasi Karikari
(74) *Attorney, Agent, or Firm* — Gardere Wynne Sewell LLP

(57) ABSTRACT

The present disclosure provides a system and method for providing radio communication at a scene, such as a fire or security scene, in an LMR system. The scene may include responder radios located within a building structure and a commander radio stationed outside, wherein the commander radio is in communication with the responder radios. Users operating the commander radio and responder radios cooperate by performing different, yet related, tasks at the scene. Therefore, the commander radio may be assigned a first set of features for communicating with responder radios, and responder radios may be assigned a second set of features for communicating with the commander radio. Some features of the system may include: locking one or more radio keys or radio knob settings, transmitting or receiving evacuation alerts, automatic switching between analog and digital communication, providing audible RSSI, indicating communication status of the radio, and providing out of range notification.

45 Claims, 4 Drawing Sheets

(56) References Cited

U.S. PATENT DOCUMENTS

| | | |
|---|---|---|
| 2009/0233641 A1 | 9/2009 | Kanazawa et al. |
| 2010/0137015 A1* | 6/2010 | Blanco .......................... 455/518 |
| 2010/0151786 A1 | 6/2010 | Alford et al. |
| 2010/0156624 A1 | 6/2010 | Hounsell |
| 2010/0159975 A1* | 6/2010 | Shaffer et al. ................. 455/516 |
| 2010/0238196 A1 | 9/2010 | Hinterberger et al. |

OTHER PUBLICATIONS

EF Johnson Technologies, "EF Johnson Technologies, Inc. Launches the 51FIRE ES Portable Radio at FDIC" website article located at http://www.efjohnson.com/news_room/viewer?article_id=27833, Apr. 21, 2010, 1 pg.

* cited by examiner

SYSTEM AND METHOD FOR PROVIDING RADIO COMMUNICATION IN A LAND MOBILE RADIO SYSTEM

CROSS-REFERENCE TO RELATED APPLICATIONS

Pursuant to 35 U.S.C. §119(e), this application claims priority from, and hereby incorporates by reference for all purposes, U.S. Provisional Patent Application Ser. No. 61/513,409, entitled "System and Method for Providing Radio Communication in a Land Mobile Radio System," filed Jul. 29, 2011, and naming Brandon Moser and John Suzuki as inventors.

TECHNICAL FIELD

The present invention relates generally to Land Mobile Radio (LMR) systems and, more specifically, to a system and set of features for operating a radio in an LMR system.

BACKGROUND

Land Mobile Radio (LMR) systems are deployed by organizations requiring instant communication between geographically dispersed and mobile personnel. Current LMR systems can be configured to provide for radio communications between one or more sites and subscriber radio units in the field. A subscriber radio unit (hereinafter "radio") may be a mobile unit or a portable unit. LMR systems can be as simple as two radio units communicating between themselves over preset channels, or they can be complex systems that include hundreds of radio units and multiple sites. Typical users of LMR systems include police departments, fire departments, medical personnel, security personnel, EMS, and the military.

Radios deployed in LMR systems may face various difficulties depending upon their use, environment, and other circumstances, thereby compromising communication in certain situations. For example, radio communication at a fire ground scene may be more challenging and demanding than regular dispatched communication as firefighters are faced with a dynamic communication environment, especially while operating in building structures during a fire or emergency situation. A simple act, such as entering a stairwell or walking down a hallway, may cause the firefighter to lose radio communication. Even worse, a firefighter may lose radio communication and not even know it. Therefore, there exists a need to provide safe and reliable radio communication to improve the safety of firefighter personnel as they operate in these dynamic environments.

SUMMARY

The present disclosure provides a system and method for providing radio communication. In one embodiment, the system comprises a first radio operable in a first mode to perform one or more first features; and a second radio operable in a second mode to perform one or more second features; wherein the first features comprise locking one or more keys or knob settings of the first radio, transmitting an evacuation command to the second radio, transmitting out-of-range beacons to the second radio, and automatically switching between analog communication and digital communication; and wherein the second features comprise locking one or more keys or knob settings of the second radio, providing an evacuation alert, providing an audible received signal strength indicator (RSSI), providing out-of-range notification, automatically switching between analog communication and digital communication, and indicating a communication status of the second radio.

Another embodiment of the present disclosure provides a radio for providing radio communication, the radio comprising a first mode of operation for performing one or more first features, and a second mode of operation for performing one or more second features. The first features comprise locking one or more keys or knob settings of the radio, transmitting an evacuation command, transmitting out-of-range beacons, and automatically switching between analog communication and digital communication. The second features comprise locking one or more keys or knob settings of the radio, providing an evacuation alert, providing an audible received signal strength indicator (RSSI), providing out-of-range notification, automatically switching between analog communication and digital communication, and indicating a communication status of the radio.

Another embodiment of the present disclosure provides a method for providing radio communication, the method comprising operating a first radio in a first mode to perform one or more first features; and operating a second radio in a second mode to perform one or more second features; wherein said first features comprise locking one or more keys or knob settings of said first radio; transmitting an evacuation command to said second radio; transmitting out-of-range beacons to said second radio; and automatically switching between analog communication and digital communication; and wherein said second features comprise locking one or more keys or knob settings of said second radio; providing an evacuation alert; providing an audible received signal strength indicator; providing out-of-range notification; automatically switching between analog communication and digital communication; and indicating a communication status of said second radio.

The foregoing and other features and advantages of one or more various embodiments of the present disclosure will become further apparent from the following detailed description of the embodiments, read in conjunction with the accompanying drawings. The description and drawings are merely illustrative of one or more various embodiments of the disclosure, rather than limiting the scope of the invention.

BRIEF DESCRIPTION OF THE DRAWINGS

Embodiments are illustrated by way of example in the accompanying figures (not necessarily shown to scale), in which like reference numbers indicate similar parts, and in which.

DETAILED DESCRIPTION OF THE DRAWINGS

The present disclosure provides a system and method for providing radio communication in an LMR system. The embodiments of the disclosed system and method are described herein with regards to providing safe and reliable radio communication to improve the safety of firefighter personnel as they operate in dynamic and dangerous communication environments. The embodiments and features disclosed herein are generally directed to radios operating in a simplex or half-duplex mode; however, it should be appreciated that these embodiments and features may also be implemented in radios operating in full-duplex mode. Additionally, with respect to embodiments in which the radios operate in a duplex mode, the radios may be incorporated in an LMR system wherein the radios communicate with one or more sites using various LMR system components such as repeaters, network interface units, and radio towers. Examples of such LMR systems may include, but are not limited to, conventional analog systems, P25 conventional systems, P25 trunking systems, various Motorola systems (e.g., SmartNet®, SmartZone®, etc.), and various EFJohnson Technologies systems (e.g., Trunked IP25™ Multi-Site, Conventional IP25™ System, Trunked IP25™ System, Hybrid IP25™, Freedom Tracker™, Multi-Net®, etc).

Although the present disclosure is directed to embodiments in which the disclosed system is implemented by firefighter personnel at a fire ground scene, it should be appreciated that the disclosed system may be utilized by other LMR system users in environments other than those disclosed herein. Examples of such other users and environments may include police personnel at an emergency response scene, search and rescue crews at a search location, or military personnel at a battle ground. The term RSSI may be used herein to refer to both a received signal strength and an indicator for indicating the received signal strength.

Figure 1:
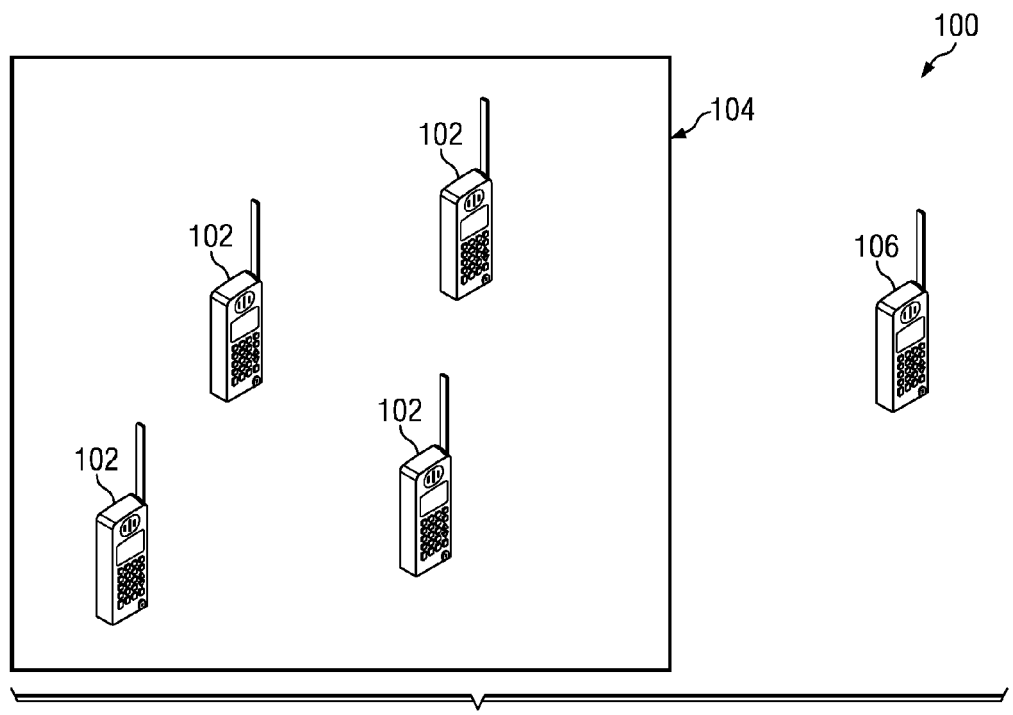
FIG. 1 illustrates a general layout of an example fire ground scene in accordance with an embodiment of the present disclosure.

FIG. 1 illustrates a general layout of an example fire ground scene 100 in accordance with the present disclosure. The fire ground scene 100 includes responder radios 102 (i.e., radios operating in a responder mode) located within a building structure 104, and a commander radio 106 (i.e., a radio operating in a commander mode) stationed outside the building structure 104, wherein the commander radio 106 is in communication with the responder radios 102 over a fire ground channel (i.e., a channel designated for communication at the fire ground scene 100). A user operating the commander radio 106 and users operating the responder radios 102 may cooperate by performing different, yet related, tasks at the fire ground scene 100. Therefore, the commander radio 106 may be assigned a first set of features for commanding, and communicating with, the responder radios 102 over the fire ground channel; and the responder radios 102 may be assigned a second set of features for responding to, and communicating with, the commander radio 106 over the fire ground channel. It should be understood that, in some embodiments, the first set of features assigned to the commander radio 106 may include some of the features that are assigned to one or more of the responder radios 102, and the second set of features assigned to a responder radio 102 may include some of the features that are assigned to the commander radio 106.

As mentioned above, a responder radio 102 is a radio operating in a responder mode, whereas a commander radio 106 is a radio operating in a commander mode. A single radio may be configured to operate in both a responder mode and a commander mode, however, a radio typically operates in only one of the modes at any given time. Whenever a radio selects or operates in the commander mode, the radio is operable to utilize the first set of features assigned to the radio for operating in the commander mode. Conversely, when the radio selects or operates in the responder mode, the radio is operable to utilize the second set of features assigned to the radio for operating in the responder mode. In addition to selecting a mode, a radio may select from a number of sub-modes, wherein each sub-mode may provide a different set of features available to the radio operating in the selected mode (i.e., commander or responder mode). In other words, a radio may be selected to operate in a commander mode or a responder mode as well as a sub-mode. The selected mode and sub-mode may be referred to herein as the selected mode/sub-mode combination. In general, the mode comprises a larger set of features, and each sub-mode comprises a smaller set of features, wherein the features in the sub-mode are selected from the features assigned to the mode.

In accordance with one embodiment of the present disclosure, some of the features associated with a commander radio 106 may include, but are not limited to, locking one or more radio keys or radio knob settings, transmitting an evacuation command to the responder radios 102, automatically switching between analog and digital communication, and transmitting out-of-range beacons at a defined interval. Additionally, some of the features associated with a responder radio 102 may include, but are not limited to, locking one or more radio keys or radio knob settings, providing an evacuation alert in response to receiving an evacuation command from a commander radio 106, providing an audible RSSI to the radio user, providing out-of-range notification to the radio user, automatically switching between analog and digital communication, and indicating a communication status of the radio. These features are discussed in greater detail below with reference to FIGS. 2-4.

One problem often encountered in the field is that a user's radio is subject to physical contact, oftentimes resulting in the radio unintentionally changing channels, adjusting the volume, or turning off. As such, the present disclosure provides a feature whereby several radio keys and radio knob settings may be locked, thereby preventing accidental adjustment of the radio settings.

Figure 2:
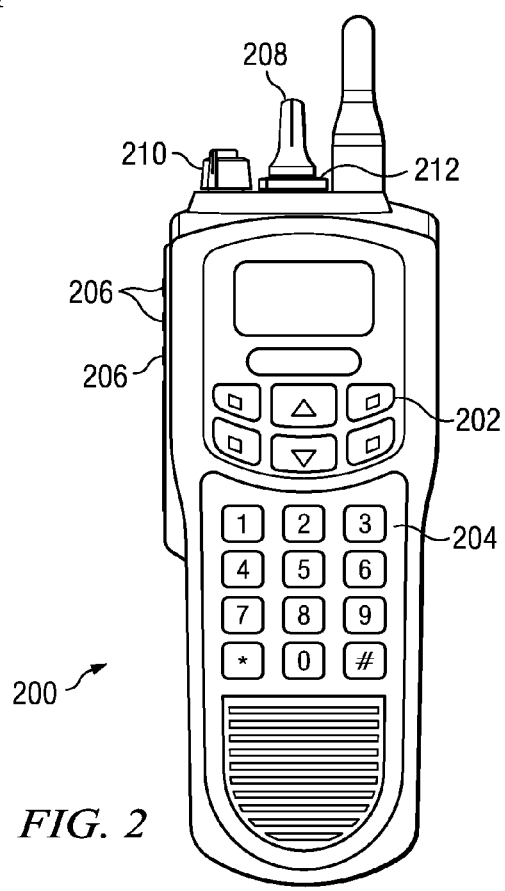
FIG. 2 illustrates an example embodiment of a radio operable for use in the disclosed system.

FIG. 2 illustrates an example radio 200 assigned the radio locking feature discussed herein, wherein the radio 200 has been configured to actuate the radio locking feature by, for example, pressing button 202. In accordance with one embodiment of the present disclosure, when the locking feature is activated, any of the front keypad 204, side buttons 206, channel selector 208, volume knob 210, toggle switch 212, and various other buttons or knobs may be locked or otherwise disabled. In some embodiments, the button 202 may be used for selecting either the commander mode or responder mode such that when the radio 200 selects a mode, the radio locking feature is automatically activated. In other embodiments, the radio locking feature may be automatically activated when the radio 200 selects the fire ground channel designated for communication between the commander radio and responder radios. In yet another embodiment, the button 202 may be used to select either the commander mode or the responder mode, wherein upon selecting the commander or responder mode, the radio 200 selects, or changes to, the fire ground channel and automatically activates the radio locking feature. The radio locking feature may be assigned to a radio operating in commander mode and a radio operating in receiver mode.

Figure 3:
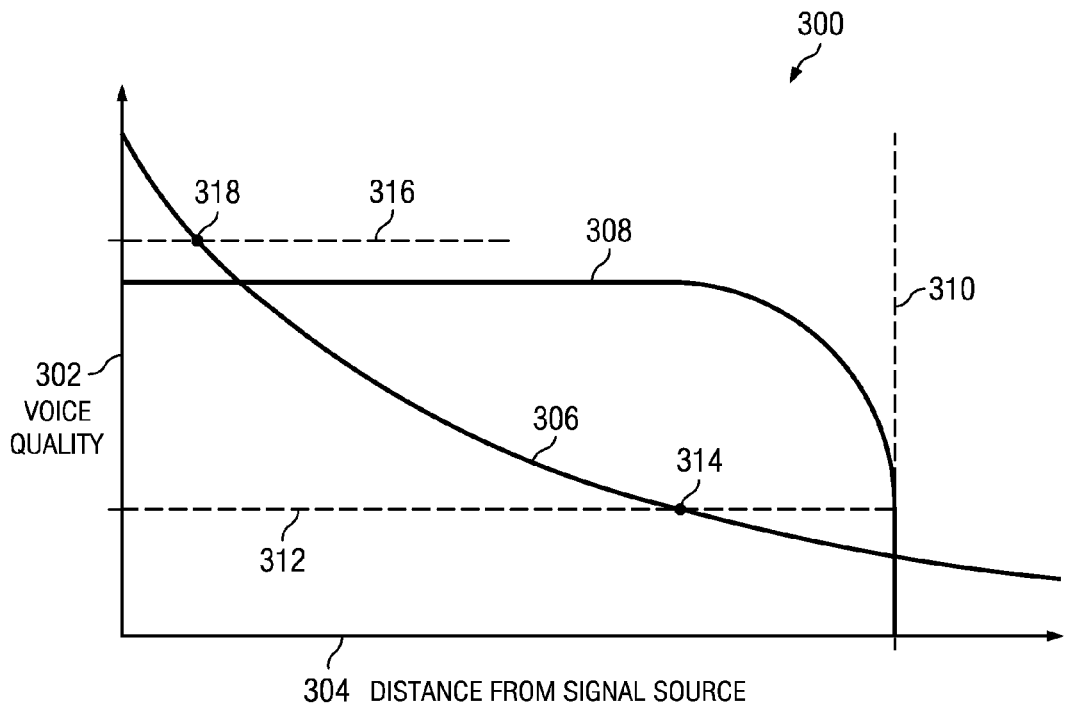
FIG. 3 illustrates a graph illustrating voice quality on a first axis and a radio's distance from a signal source on a second axis.
Figure 4:
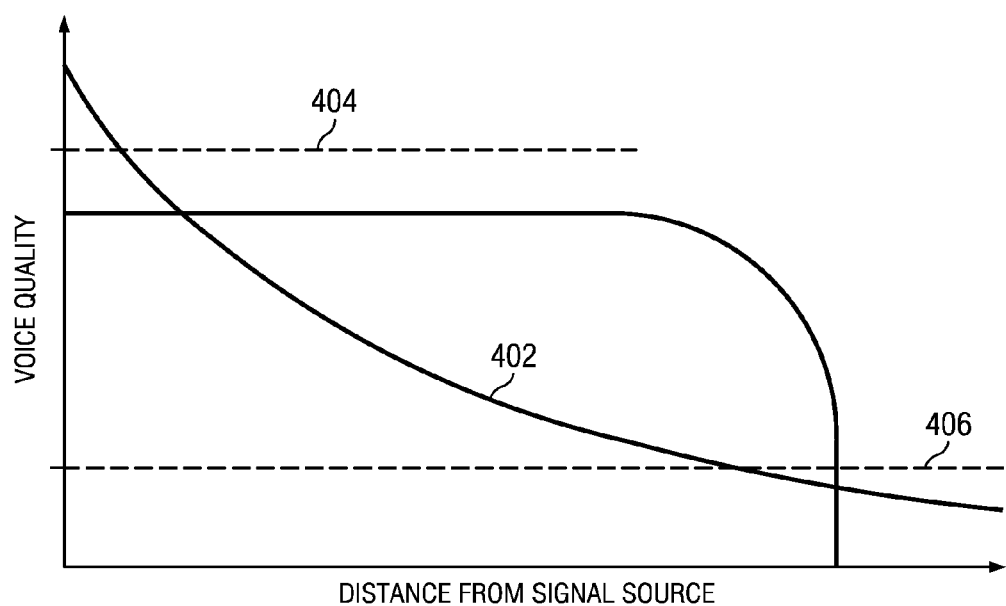
FIG. 4 illustrates a graph similar to that provided in FIG. 3, wherein the graph in FIG. 4 illustrates RSSI thresholds in accordance with an embodiment of the present disclosure.

FIG. 3 illustrates a graph 300 of analog and digital signals with voice quality on a first axis 302 and a radio's distance from a signal source on a second axis 304. The graph 300 provides a first line 306 representing the radio's analog signal, and a second line 308 representing the radio's digital signal. In general, when a radio is operating in an analog communication mode (see line 306), the radio's voice quality is greatest when the radio is in close proximity to the signal source (e.g., another radio when communicating in simplex mode, or a radio tower when communicating in a duplex mode), and decreases as the radio moves away from the signal source. When a radio is operating in a digital communication mode (see line 308), the radio's voice quality remains substantially consistent until the radio approaches a distance threshold 310, at which point the voice quality decreases exponentially.

In general, as a radio's received signal strength (also referred to herein as RSSI) decreases, the voice quality of communication to and from the radio also decreases. Therefore, in some conditions, it may be preferable to operate in a digital communication mode and, in other conditions, it may be preferable to operate in an analog communication mode. However, to achieve the best voice quality in existing radio systems, a user would have to monitor the voice quality of communication and manually switch the radio between analog and digital communication modes, thereby requiring the user to devote a significant amount of time and attention to monitoring the voice quality of the radio. Obviously, when operating at a fire ground scene, a user does not have sufficient time to monitor radio voice quality. Therefore, the present disclosure provides a feature whereby the radio's communication mode may be automatically switched between a digital communication mode and an analog communication mode, depending on the radio's received signal strength, without requiring radio user input.

Referring again to FIG. 3, in one embodiment, a radio may be operating in the analog communication mode until the analog signal 306 drops below a lower received signal strength threshold 312 (see point 314). When this occurs, the radio may switch to the digital communication mode (see line 308), thereby providing a communication mode with a higher voice quality in low analog signal conditions. Additionally, in some embodiments, the radio may switch from the digital communication mode to the analog communication mode when the analog signal 306 reaches an upper received signal strength threshold 316 (see point 318). It should be understood that the thresholds described for switching between an analog and digital communication mode are provided as examples. Accordingly, the thresholds may be set as preferred by a user. For example, in some embodiments, the radio may be programmed to switch between the digital mode and the analog mode depending upon which signal (digital 308 or analog 306) provides greater voice quality. In yet another embodiment, the radio may switch from the analog communication mode to the digital communication mode when the received signal falls below a threshold, and then switch back to the analog communication mode when the analog signal rises above the threshold. The automatic communication switching feature described herein may be assigned to a radio operating in commander mode and a radio operating in receiver mode.

When operating at a fire ground scene, responder radios 102 may need to be alerted to an ordered evacuation of the building structure 104 (also referred to herein as an evacuation command). Since responder radio users may be distracted or operating in low signal conditions, an evacuation ordered using voice communication may go unnoticed or otherwise not clearly received by the user. As such, the present disclosure provides an evacuation alert feature whereby a responder radio 102 is alerted to an evacuation command in a manner that is unlikely to be unnoticed by a radio user. An evacuation command may be transmitted from the commander radio 106 to one or more responder radios 102, wherein upon receipt of the evacuation command, a responder radio 102 may produce an evacuation alert such as, for example, an audible and visual indication notifying the radio user of the evacuation command. In some embodiments, a physical indication may also be provided such as, for example, a vibration of the radio unit 102 or other device.

In one embodiment, a commander radio 106 may issue an evacuation command by pressing an evacuation button for a period of time, thereby transmitting the evacuation command to one or more responder radios 102. In some embodiments, the commander radio 106 may attempt to transmit the evacuation command for a number of times with a delay between each transmission in order to increase the probability that the evacuation command is received by the responder radios 102. When a responder radio 102 receives an evacuation command, the responder radio 102 issues an evacuation alert to the radio user by providing at least one of a visual indication (e.g., flashing a strobe or displaying a message), a physical indication (e.g., radio vibration), or an audible indication such as, for example, sounding an alarm. Once an evacuation command is received by a responder radio 102, the radio 102 may, in one embodiment, acknowledge the evacuation command by pressing a button, thereby silencing the alarm. Additionally, the radio user may, in one embodiment, cancel the evacuation alert by pressing the Push-To-Talk (PTT) button, thereby silencing the alarm and canceling the visual indication. In some embodiments, the responder radio 102 may process only one evacuation command in a given timeframe in order to avoid multiple evacuation alerts occurring at the same time. It should be appreciated that the evacuation alert feature discussed herein may be performed in a simplex mode or a duplex mode without departing from the scope of the present disclosure.

When operating at a fire ground scene, a user may not be aware of the range of communication of their radio, nor may they be aware when their radio is nearing the outer range of communication. As such, the present disclosure provides several features for alerting a user to the communication status of their radio. One such feature includes an audible RSSI whereby the user's radio provides audible tones to alert the user when the user's radio is nearing a received signal strength threshold (also referred to herein as an RSSI threshold). It should be noted that an RSSI threshold is programmable and may correspond to an RSSI level to indicate the strength of a signal received by a radio. In some embodiments, the RSSI levels include (in descending order) Excellent, Good, Fair, Poor and out of range (OOR). In one embodiment, a radio measures the radio's received signal strength at the beginning of a call, and then produces an audible tone to indicate the measured RSSI. The audible RSSI may, in some embodiments, be provided in conjunction with a visual RSSI, and/or a physical indication (e.g., vibration). Table 1 illustrates corresponding tones emitted in an example embodiment of the audible RSSI feature.

TABLE 1

| RSSI Level | RSSI Indicator Bars | Tone Heard |
|---|---|---|
| Above Good | 3 or 4 bars | No tone |
| Above Fair, Below Good | 2 bars | 2 beeps |
| Above OOR, Below Fair | 1 bar | 4 beeps |
| Below OOR | "X" | 4 beeps |

The audible RSSI thresholds are programmable such that a user may determine the RSSI level for which the user wishes to be notified. One such example is provided in FIG. 4, wherein the audible RSSI feature provides a first audible warning (e.g., two beeps) when the analog RSSI 402 reaches a first threshold 404, and provides a second audible warning (e.g., four beeps) when the analog RSSI 402 reaches a second threshold 406. In this embodiment, the first threshold 404 is provided to indicate when the radio has strong received signal strength (and voice quality), and the second threshold 406 is provided to indicate poor received signal strength thereby warning of impending communication loss and poor voice quality. It should be appreciated that the audible RSSI feature may be activated on a radio operating in either digital communication mode or analog communication mode. Additionally, in some embodiments, the audible RSSI feature may measure the RSSI not only upon receipt or transmission of digital and analog voice calls, but also upon detection of any carrier events such as, for example, out of range beacons. In other embodiments, a radio may constantly monitor its received signal strength and provide the audible RSSI when the received signal strength reaches one of the RSSI thresholds. The audible RSSI feature described herein may be assigned to a radio operating in commander mode and a radio operating in receiver mode.

Another feature for alerting a user to the communication status of their radio is the communications check feature. The communications check feature is provided to quickly and easily update a user to the communication status of their radio. In one embodiment, a user may actuate the communications check feature by pressing a communications check button. When the button is pressed, the radio may sound one of several tones to indicate the radio's RSSI, thereby alerting the user to the radio's communication status without requiring the user to visually check the radio, which may be difficult due to the conditions of a fire ground scene. In some embodiments, the radio may sound a different tone for each RSSI level or, in other embodiments, the radio may sound a different number of beeps for each RSSI level. In other embodiments, the communications check status may include a visual RSSI notification (e.g., a strobe flashing to indicate the RSSI level) and/or a physical notification such as, for example, a number of vibrations to indicate the RSSI level.

In some embodiments, when the communications check button is pressed on a responder radio 102, the responder radio 102 requests the current RSSI level from the commander radio 106. If the responder radio 102 is in communication range with the commander radio 106, the commander radio 106 responds with the RSSI level of the responder radio 102. If the RSSI level is "Excellent" or "Good," the responder radio 102 may sound a "favorable" tone. If the RSSI level is "Fair," the responder radio 102 may sound two beeps, and if the RSSI level is "Poor" or "OOR," the responder radio may sound four beeps. In some embodiments, if the responder radio 102 fails to receive the RSSI level from the commander radio 106 after requesting a communications check, the responder radio 102 may retry the communications check for a number of attempts with a wait time between each retry attempt. If all retry attempts fail, then the responder radio 102 may perform an OOR notification (if the OOR feature discussed below is assigned to the radio's currently selected mode/sub-mode combination), otherwise the radio 102 may display a message indicating that the communications check failed. It should be appreciated that the communications check feature discussed herein may be performed in a simplex mode or a duplex mode without departing from the scope of the present disclosure.

Yet another feature for alerting a user to the communication status of their radio is the out-of-range (OOR) feature. The OOR feature may be assigned to both radios operating in the commander mode and radios operating in the responder mode; however, the OOR feature operates differently depending on whether the radio is operating in commander mode or responder mode. For example, when a radio is operating in the commander mode, the OOR feature allows the radio to transmit OOR beacons at user-defined intervals. OOR beacons are data packets transmitted by a commander radio 106, wherein the receipt of said OOR beacons by a responder radio 102 indicates that the responder radio 102 is in communication with the signal source of the responder radio 102. In some embodiments, the OOR beacons are transmitted over the fire ground channel in-between voice communications. In embodiments in which the commander radio 106 and the responder radio 102 are operating in a simplex mode, the commander radio 106 transmits the OOR beacons directly to the responder radio 102; as such, the signal source of the responder radio 102 is the commander radio 106. In embodiments in which the commander radio 106 and the responder radio 102 are operating in a duplex mode, the commander radio 106 transmits the OOR beacons through the LMR system, and the signal source of the responder radio 102 may be various LMR system components such as, for example, a repeater or radio tower.

When a radio is operating in the responder mode, the OOR feature allows the radio to provide OOR notification to the radio user if the radio fails to receive an OOR beacon, or other carrier event, for a user-defined period of time. A carrier event may include, for example, OOR beacons, voice communication, or any other communication detected by the radio. In some embodiments, a carrier event may not be received by the radio if the carrier event is below an acceptable RSSI threshold. In such embodiments, the radio provides OOR notification if it fails to receive a carrier event at an acceptable RSSI level for a defined period of time. A period of time for which a radio operating in responder mode fails to receive a carrier event may be referred to herein as a period of inactivity. Accordingly, a responder radio 102 assigned the OOR feature may provide OOR notification if the responder radio 102 detects a period of inactivity exceeding the user-defined period of time for detecting a carrier event.

Provided now is one example embodiment describing the OOR feature, wherein a commander radio 106 and a responder radio 102 are operating in a simplex communication mode. In this embodiment, the commander radio 106 transmits OOR beacons to the responder radio 102 at five-second intervals, and the responder radio 102 checks for seven consecutive seconds of inactivity. In one embodiment, if the responder radio 102 detects seven consecutive seconds of inactivity (i.e., the radio fails to receive a carrier event during the seven seconds), the responder radio 102 notifies the radio user that the radio 102 is out of range of communication with the commander radio 106. In some embodiments, the OOR notification may include at least one of an audible, visual, or a physical notification such as, for example, an alarm tone, flashing light, or vibration. It should be understood that the time intervals discussed herein are merely provided as examples used to illustrate one or more embodiments of the present disclosure. As such, embodiments of the present disclosure should not be limited to the time intervals discussed herein which may be set by a user as discussed below with reference to FIGS. 5A-5D.

The foregoing features may be assigned to various mode/sub-mode combinations such that when a radio selects a particular mode/sub-mode combination, one or more features are made available to the radio. Additionally, some features may be configured for all mode/sub-mode combinations and, therefore, may not need to be assigned to particular mode/sub-mode combinations. FIGS. 5A-5D provide an example configuration interface 500 for assigning features to the various mode/sub-mode combinations. It should be appreciated that the configuration interface 500 is provided as one example means for assigning certain features to a radio mode/sub-mode, and that the configuration interface 500 is not limited to the features shown or the design or layout of the interface 500 as illustrated in FIGS. 5A-5D.

In the embodiment shown in FIGS. 5A-5D, the configuration interface 500 is designed such that an interface user assigns features to a mode/sub-mode by first selecting a sub-mode 506, and then selecting the features that are assigned to the commander mode (commander features 502) and the features that are assigned to the responder mode (responder features 504). In this embodiment, a radio in the field may access a particular mode/sub-mode feature set by selecting a sub-mode number and then selecting either the responder mode or the commander mode.

In another embodiment (not shown), the configuration interface may be designed such that the interface user assigns features to a mode/sub-mode by first selecting a mode (i.e., commander mode or responder mode), and then selecting the features assigned to each sub-mode. In this embodiment, a radio in the field may access a particular mode/sub-mode feature set by selecting a commander mode or responder mode and then selecting a sub-mode.

FIGS. 5A-5D each illustrate one of four sub-modes 506, a set of features that may be assigned to a commander mode (commander features 502), a set of features that may be assigned to a responder mode (responder features 504), and the zone 520 and channel 522 comprising the fire ground channel 524. When a radio selects a specific sub-mode 506, the radio is capable of accessing the commander features 502 and responder features 504 assigned to that sub-mode 506, and communicating over the fire ground channel 524 defined by the selected zone 520 and channel 522. As shown in FIGS. 5A-5D, the commander features 502 may include one or more of the features discussed herein such as, for example, the radio locking feature 508, the automatic communication switching feature 510, and the out of range feature 512. When an interface user selects the out of range feature 512 for the commander mode (see FIG. 5D), the user may also select the frequency at which OOR beacons are transmitted by selecting a value in the beacon interval box 514. The responder features 504 may include one or more of the features discussed herein such as, for example, the radio locking feature 508, the automatic communication switching feature 510, the audible RSSI feature 516, and the out of range feature 512. When the interface user selects the out of range feature 512 for the responder mode (see FIG. 5D), the user may also select the inactivity duration (discussed above) by selecting a value in the inactivity duration box 518. It should be appreciated that the commander features 502 and responder features 504 are not limited to those shown and described herein. As such, the commander features 502 and responder features 504 may include additional features not shown in FIGS. 5A-5D including, for example, any of the features disclosed herein as well as other features not otherwise disclosed herein.

The embodiments illustrated in FIGS. 5A-5D are described below, wherein the commander features 502, responder features 504, and fire ground channel 524 shown and/or selected in FIGS. 5A-5D represent example feature sets and channels assigned to a given mode/sub-mode combination. The selected commander features 502, responder features 504, and fire ground channel 524 may be changed or reassigned by a user interfacing with the configuration menu 500. The features shown in FIGS. 5A-5D represent only some of the features that may be assigned to a particular radio's selected mode/sub-mode combination. As such, any of the features disclosed herein may be assigned to a particular mode/sub-mode combination. Additionally, it should be appreciated that the fire ground channel 524 may be any zone 520 and channel 522 defined for a particular radio, and is not limited to a particular communication protocol (e.g., conventional, trunking, etc.).

Figure 5A:
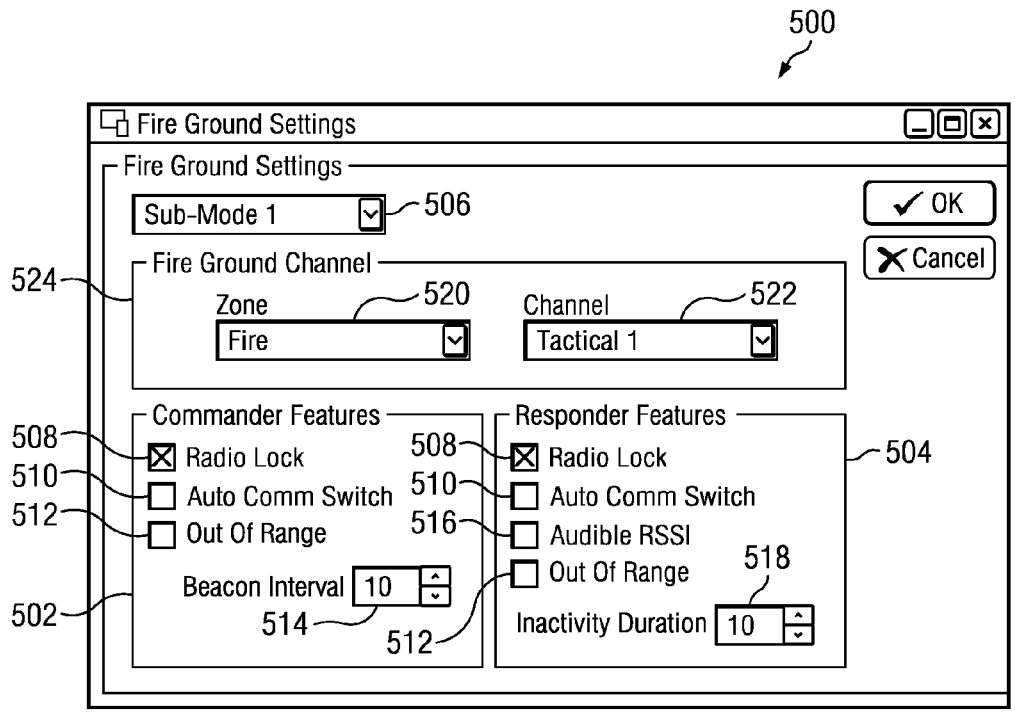
FIG. 5A illustrates an example configuration interface for configuring a radio with commander features and responder features when the radio selects a first sub-mode.

FIG. 5A illustrates a configuration interface 500 for configuring a radio with commander features 502 and responder features 504 when the radio selects a first sub-mode 506 (i.e., Sub-Mode 1). As shown in FIG. 5A, zone "Fire" and channel "Tactical 1" are designated as the fire ground channel 524, and the radio locking feature 508 is assigned to the commander mode and the responder mode for Sub-Mode 1. As such, when the radio selects Sub-Mode 1, the radio is capable of performing the radio locking feature discussed above when operating in either the command mode or the responder mode.

Figure 5B:
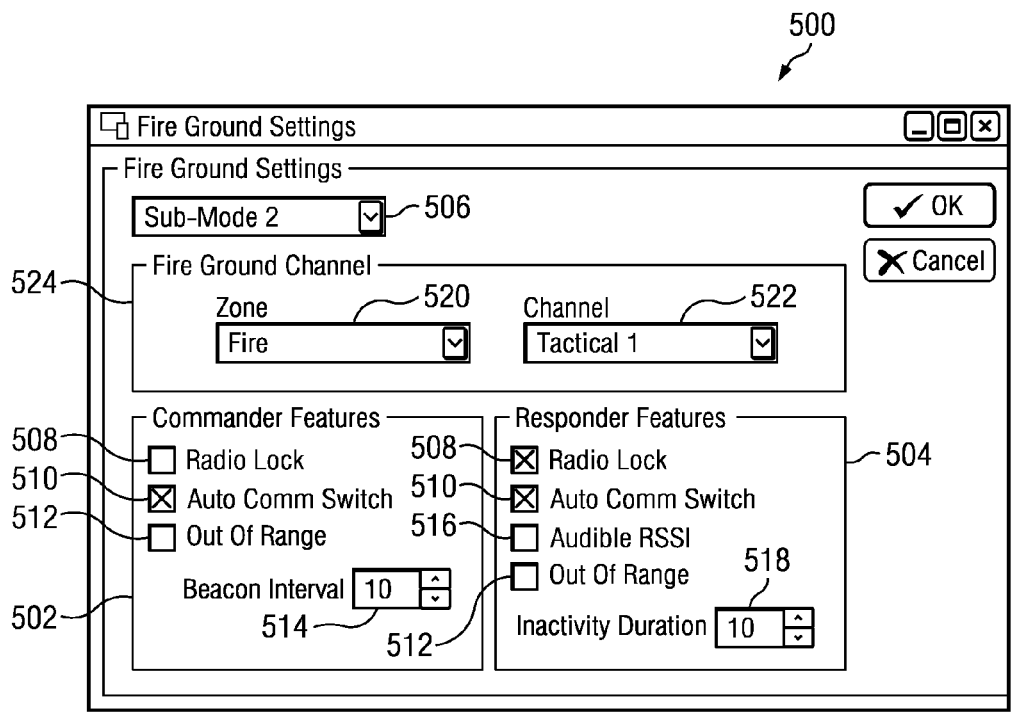
FIG. 5B illustrates an example configuration interface for configuring a radio with commander features and responder features when the radio selects a second sub-mode.

FIG. 5B illustrates a configuration interface 500 for configuring a radio with commander features 502 and responder features 504 when the radio selects a second sub-mode 506 (i.e., Sub-Mode 2). As shown in FIG. 5B, zone "Fire" and channel "Tactical 1" are designated as the fire ground channel 524, the automatic communication switching feature 510 is assigned to both the commander mode and the responder mode, and the radio locking feature 508 is assigned only to the responder mode for Sub-Mode 2. As such, when the radio is operating in the commander mode/Sub-Mode 2 combination, the radio is capable of performing the automatic communication switching feature discussed above. When the radio is operating in the responder mode/Sub-Mode 2 combination, the radio is capable of performing both the automatic communication switching feature and the radio locking feature.

Figure 5C:
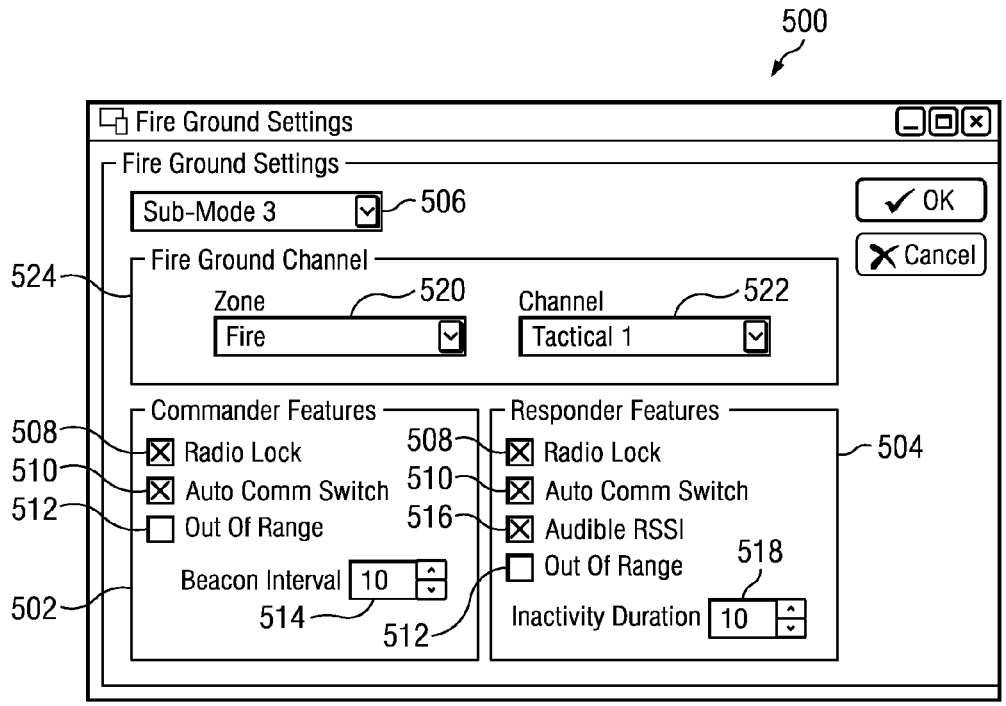
FIG. 5C illustrates an example configuration interface for configuring a radio with commander features and responder features when the radio selects a third sub-mode.

FIG. 5C illustrates a configuration interface 500 for configuring a radio with commander features 502 and responder features 504 when the radio selects a third sub-mode 506 (i.e., Sub-Mode 3). As shown in FIG. 5C, zone "Fire" and channel "Tactical 1" are designated as the fire ground channel 524, the radio locking feature 508 and the automatic communication switching feature 510 are assigned to both the commander mode and the responder mode for Sub-Mode 3, and the audible RSSI feature 516 is assigned only to the responder mode. As such, when the radio is operating in the commander mode/Sub-Mode 3 combination, the radio is capable of performing the radio locking and automatic communication switching features. When the radio is operating in the responder mode/Sub-Mode 3 combination, the radio is capable of performing the radio locking, automatic communication switching, and audible RSSI features discussed above.

Figure 5D:
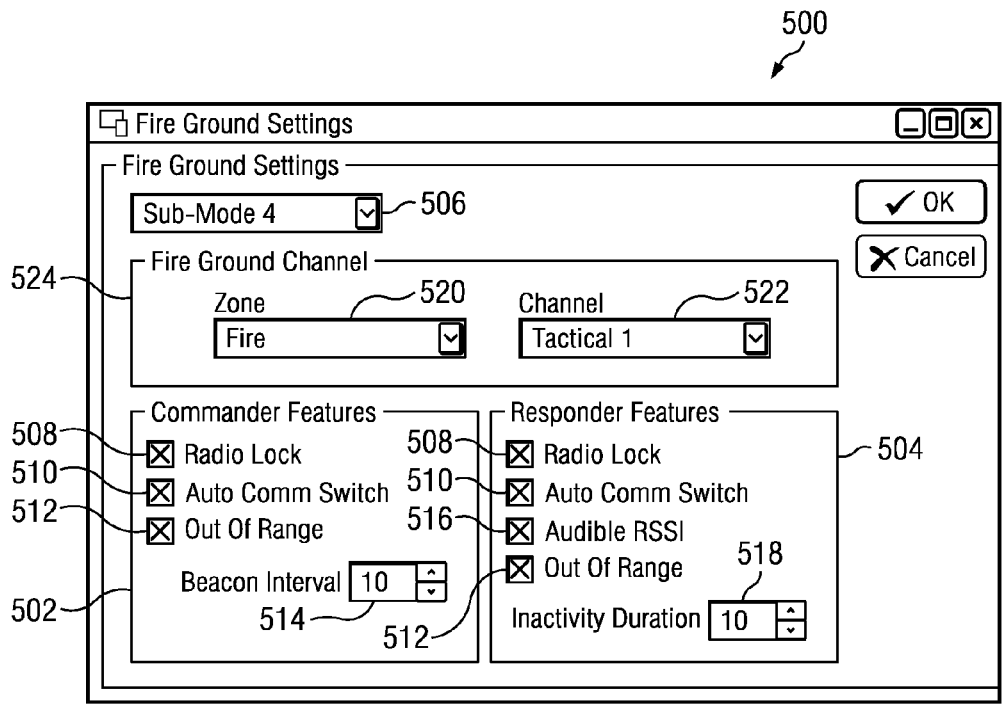
FIG. 5D illustrates an example configuration interface for configuring a radio with commander features and responder features when the radio selects a fourth sub-mode.

FIG. 5D illustrates a configuration interface 500 for configuring a radio with commander features 502 and responder features 504 when the radio selects a fourth sub-mode 506

(i.e., Sub-Mode 4). As shown in FIG. 5D, zone "Fire" and channel "Tactical 1" are designated as the fire ground channel 524, the radio locking feature 508, the automatic communication switching feature 510, and the out of range feature 512 are assigned to both the commander mode and the responder mode for Sub-Mode 4 with the beacon interval 514 set to ten, and the inactivity duration 518 set to ten. Additionally, the audible RSSI feature 516 is assigned only to the responder mode. As such, when the radio is operating in the commander mode/Sub-Mode 4 combination, the radio is capable of performing the radio locking, automatic communication switching, and out of range features as discussed above, wherein the radio transmits OOR beacons at ten-second intervals. When the radio is operating in the responder mode/Sub-Mode 4 combination, the radio is capable of performing the radio locking, automatic communication switching, audible RSSI, and out of range features as discussed above, wherein the radio performs an OOR notification if the radio detects ten seconds of inactivity.

The figures and text provided herein are provided to disclose aspects of the invention and/or to provide one or more examples of various embodiments of the present disclosure. The examples and embodiments provided herein are not intended to limit the scope or spirit of the present disclosure as defined in the claims provided below.

What is claimed is:

1. A system for providing radio communication in a Land Mobile Radio (LMR) system, the system comprising:
    a first radio operable in a first mode to perform one or more first mode operations, the first mode operations comprising:
        locking one or more keys or knob settings of the first radio,
        transmitting an evacuation command to other radios in the LMR system, and
        transmitting one or more out-of-range beacons; and
    a second radio operable in a second mode to perform one or more second mode operations, the second mode operations comprising:
        locking one or more keys or knob settings of the second radio,
        providing at least one of an audible, visual, or physical indication of an evacuation alert in response to receiving an evacuation command,
        providing at least one of an audible, visual, or physical indication of a received signal strength of the second radio,
        providing at least one of an audible, visual, or physical indication when the second radio is out of communication range of a signal source, and
        indicating a communication status of the second radio.

2. The system as set forth in claim 1, wherein at least one of the first mode operations or the second mode operations further comprises automatically switching between an analog radio communication mode and a digital radio communication mode.

3. The system as set forth in claim 2, wherein automatically switching between the analog radio communication mode and the digital radio communication mode comprises the first or second radio automatically switching between the analog radio communication mode and the digital radio communication mode, based on a received signal strength of the respective first or second radio.

4. The system as set forth in claim 3, wherein the received signal strength is a received analog signal strength or a received digital signal strength.

5. The system as set forth in claim 3, wherein the first or second radio automatically switches between the digital radio communication mode and the analog radio communication mode based on a comparison of the received signal strength and a second received signal strength.

6. The system as set forth in claim 3, wherein the first or second radio automatically switches between the analog radio communication mode and the digital radio communication mode when the received signal strength of the first or second radio reaches a received signal strength threshold.

7. The system as set forth in claim 1, wherein the one or more out-of-range beacons are transmitted at defined time intervals.

8. The system as set forth in claim 1, wherein the out-of-range beacons are transmitted over a communication channel.

9. The system as set forth in claim 1, wherein the first mode operations further comprise:
    providing at least one of an audible, visual, or physical indication of a received signal strength of the first radio; and
    indicating a communication status of the first radio.

10. The system as set forth in claim 1, wherein indicating a communication status of the second radio comprises providing at least one of an audible, visual, or physical indication of a received signal strength of the second radio.

11. The system as set forth in claim 1, wherein the second radio is considered to be out of communication range of the signal source when the second radio fails to receive a carrier event for a defined period of time.

12. The system as set forth in claim 11, wherein the carrier event comprises at least one of voice communication, data communication, or an out-of-range beacon.

13. The system as set forth in claim 1, further comprising:
    an interface for assigning one or more first mode operations to the first radio and one or more second mode operations to the second radio.

14. The system as set forth in claim 1, wherein locking one or more keys or knob settings of the first or second radio occurs automatically when the first or second radio selects a communication channel.

15. A radio for providing radio communication in a Land Mobile Radio (LMR) system, the radio comprising:
    a first mode of operation for communicating with other radios performing one or more first mode operations, the first mode operations comprising:
        locking one or more keys or knob settings of the radio,
        transmitting an evacuation command to other radios in the LMR system, and
        transmitting one or more out-of-range beacons; and
    a second mode of operation for performing one or more second mode operations, the second mode operations comprising:
        locking one or more keys or knob settings of the radio,
        providing at least one of an audible, visual, or physical indication of an evacuation alert in response to receiving an evacuation command,
        providing at least one of an audible, visual, or physical indication of a received signal strength of the radio,
        providing at least one of an audible, visual, or physical indication when the radio is out of communication range of a signal source, and
        indicating a communication status of the radio,
    wherein the radio is operable in the first mode to communicate with one or more other radios operating in the second mode, and is operable in the second mode to communicate with one or more other radios operating in the first mode.

16. The radio as set forth in claim 15, wherein at least one of the first mode operations or the second mode operations further comprises automatically switching between an analog radio communication mode and a digital radio communication mode.

17. The radio as set forth in claim 16, wherein automatically switching between the analog radio communication mode and the digital radio communication mode is based on a received signal strength of the radio.

18. The radio as set forth in claim 17, wherein the received signal strength of the radio is a received analog signal strength or a received digital signal strength.

19. The radio as set forth in claim 17, wherein the radio automatically switches between the digital radio communication mode and the analog radio communication mode based on a comparison of the received signal strength and a second received signal strength.

20. The radio as set forth in claim 17, wherein the radio automatically switches between the analog radio communication mode and the digital radio communication mode when the received signal strength reaches a received signal strength threshold.

21. The radio as set forth in claim 15, wherein the one or more out-of-range beacons are transmitted at defined time intervals.

22. The radio as set forth in claim 15, wherein the out-of-range beacons are transmitted over a communication channel.

23. The radio as set forth in claim 15, wherein the first mode operations further comprise:
providing at least one of an audible, visual or physical indication of a received signal strength of the radio; and
indicating a communication status of the radio.

24. The radio as set forth in claim 15, wherein indicating a communication status of the radio comprises providing at least one of an audible, visual, or physical indication of a received signal strength of the radio.

25. The radio as set forth in claim 15, wherein the radio is considered to be out of communication range of the signal source when the radio fails to receive a carrier event for a defined period of time.

26. The radio as set forth in claim 25, wherein the carrier event comprises at least one of voice communication, data communication, or an out-of-range beacon.

27. The radio as set forth in claim 15, wherein locking one or more keys or knob settings of the radio occurs automatically when the radio selects a communication channel.

28. A method for providing radio communication in a Land Mobile Radio (LMR) system that includes a first radio in communication with a second radio, the method comprising:
operating the first radio in a first mode to perform one or more first mode operations, the first mode operations comprising:
locking one or more keys or knob settings of the first radio,
transmitting an evacuation command to other radios in the LMR system, and
transmitting one or more out-of-range beacons; and
operating the second radio in a second mode to perform one or more second mode operations, the second mode operations comprising:
locking one or more keys or knob settings of the second radio,
providing at least one of an audible, visual, or physical indication of an evacuation alert in response to receiving an evacuation command from the first radio,
providing at least one of an audible, visual, or physical indication of a received signal strength of the second radio,
providing at least one of an audible, visual, or physical indication when the second radio is out of communication range of a signal source, and
indicating a communication status of the second radio.

29. The method as set forth in claim 28, further comprising transmitting the one or more out-of-range beacons at defined time intervals.

30. The method as set forth in claim 28, wherein locking one or more keys or knob settings of the first or second radio comprises automatically locking one or more keys or knob settings of the first or second radio when the first or second radio selects a communication channel.

31. The method as set forth in claim 28, wherein the first mode operations further comprise:
providing at least one of an audible, visual or physical indication of a received signal strength of the first radio; and
indicating a communication status of the first radio.

32. The method as set forth in claim 28, wherein at least one of the first mode operations or the second mode operations further comprises automatically switching between an analog radio communication mode and a digital radio communication mode.

33. The method as set forth in claim 32, wherein automatically switching between the analog radio communication mode and the digital radio communication mode comprises:
comparing a received analog signal strength to a received digital signal strength;
switching to the analog radio communication mode if the received analog signal strength is greater than the received digital signal strength; and
switching to the digital radio communication mode if the received digital signal strength is greater than the received analog signal strength.

34. The method as set forth in claim 32, wherein automatically switching between the analog radio communication mode and the digital radio communication mode comprises:
comparing a received signal strength to a first received signal strength threshold and a second received signal strength threshold;
switching to the analog radio communication mode if the received signal strength is greater than the first received signal strength threshold; and
switching to the digital radio communication mode if the received signal strength is less than the second received signal strength threshold.

35. The method as set forth in claim 34, wherein the first received signal strength threshold is equal to the second received signal strength threshold.

36. The method as set forth in claim 34, wherein the received signal strength is a received analog signal strength or a received digital signal strength.

37. The method as set forth in claim 28, wherein providing at least one of an audible, visual or physical indication of the received signal strength of the second radio comprises:
measuring the received signal strength of the second radio; and
providing the at least one of the audible, visual or physical indication of the measured received signal strength.

38. The method as set forth in claim 37, wherein the received signal strength is measured upon receipt or transmission of a call.

39. The method as set forth in claim 37, wherein the received signal strength is measured upon detection of a carrier event.

40. The method as set forth in claim 28, wherein providing at least one of an audible, visual or physical indication of the received signal strength of the second radio comprises:
measuring the received signal strength of the second radio;
comparing the measured received signal strength to one or more signal thresholds; and
providing the at least one of the audible, visual or physical indication of the measured received signal strength when the measured received signal strength reaches one of the one or more signal thresholds.

41. The method as set forth in claim 28, wherein indicating the communication status of the second radio comprises:
requesting a received signal strength level from the first radio;
receiving the received signal strength level from the first radio if the second radio is in communication range of the first radio; and
providing at least one of an audible, visual, or physical indication of the received signal strength level.

42. The method as set forth in claim 41, further comprising:
repeating the request for the received signal strength level from the first radio one or more times if the second radio fails to receive the received signal strength level from the first radio; and
providing the at least one of the audible, visual, or physical indication that the second radio is out of communication range of the signal source if the second radio fails to receive the received signal strength level from the first radio after the one or more times of repeating the request for the received signal strength level.

43. The method as set forth in claim 41, further comprising:
repeating the request for the received signal strength level from the first radio one or more times if the second radio fails to receive the received signal strength level from the first radio; and
providing a message indicating whether the second radio fails to receive the received signal strength level from the first radio after the one or more times of repeating the request for the received signal strength level.

44. The method as set forth in claim 28, wherein providing the at least one of the audible, visual, or physical indication that the second radio is out of communication range of the signal source comprises:
monitoring a communication channel; and
providing the at least one of the audible, visual, or physical indication that the second radio is out of communication range of the signal source if the second radio fails to detect a carrier event over the communication channel for a defined period of time.

45. The method as set forth in claim 44, wherein the carrier event comprises at least one of voice communication, data communication, or an out-of-range beacon.

* * * * *